(12) United States Patent
Seo

(10) Patent No.: US 7,379,092 B2
(45) Date of Patent: May 27, 2008

(54) STAGE APPARATUS AND CAMERA SHAKE CORRECTION APPARATUS USING THE STAGE APPARATUS

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 667 days.

(21) Appl. No.: 11/062,694

(22) Filed: Feb. 23, 2005

(65) Prior Publication Data

US 2005/0185057 A1    Aug. 25, 2005

(30) Foreign Application Priority Data

Feb. 24, 2004    (JP) .............................. 2004-048365

(51) Int. Cl.
*H04N 5/228* (2006.01)
*G03B 7/00* (2006.01)

(52) U.S. Cl. ..................................... 348/208.4; 396/55

(58) Field of Classification Search ............. 348/208.4, 348/208.7, 208.11; 396/55, 56
See application file for complete search history.

(56) References Cited

U.S. PATENT DOCUMENTS

| | | | | |
|---|---|---|---|---|
| 4,171,657 A | * | 10/1979 | Halberschmidt et al. ....... | 83/886 |
| 4,320,943 A | * | 3/1982 | Link .......................... | 353/27 R |
| 4,995,277 A | * | 2/1991 | Yanagisawa ............... | 74/490.09 |
| 5,748,391 A | * | 5/1998 | Tanaka et al. ............... | 359/813 |
| 5,748,995 A | * | 5/1998 | Kitagawa et al. ............. | 396/55 |
| 6,005,723 A | * | 12/1999 | Kosaka et al. ............... | 359/822 |
| 6,070,480 A | * | 6/2000 | Kerschner .................... | 74/89.2 |
| 6,909,560 B2 | * | 6/2005 | Lin et al. ..................... | 359/813 |
| 7,224,893 B2 | * | 5/2007 | Uenaka ........................ | 396/55 |

FOREIGN PATENT DOCUMENTS

| JP | 8-304868 | 11/1996 |
|---|---|---|
| JP | 2003-057707 | 2/2003 |

OTHER PUBLICATIONS

English Language Abstract of JP 2003-057707.
U.S. Appl. No. 11/036,123 to SEO, filed Jan. 18, 2005.

* cited by examiner

*Primary Examiner*—David Ometz
*Assistant Examiner*—Tuan Le
(74) *Attorney, Agent, or Firm*—Greenblum & Bernstein, P.L.C.

(57) ABSTRACT

A stage apparatus includes a stationary support plate; an X-direction moving member supported on the stationary support plate by an X-direction guide device; and a Y-direction moving member supported on the X-direction moving member by a Y-direction guide device. The X-direction guide device has an X-direction elongated hole extending in the X-direction and formed in one of the X-direction moving member and the stationary support plate, and an X-direction engagement projection provided on the other of the X-direction moving member and the stationary support plate and is engaged in the X-direction elongated hole. The Y-direction guide device has a Y-direction elongated hole extending in the Y-direction and formed in one of the X-direction and Y-direction moving members, and a Y-direction engagement projection which is provided on the other of the X-direction and Y-direction moving members and is engaged in the Y-direction elongated hole.

6 Claims, 8 Drawing Sheets

Fig. 2
Fig. 3
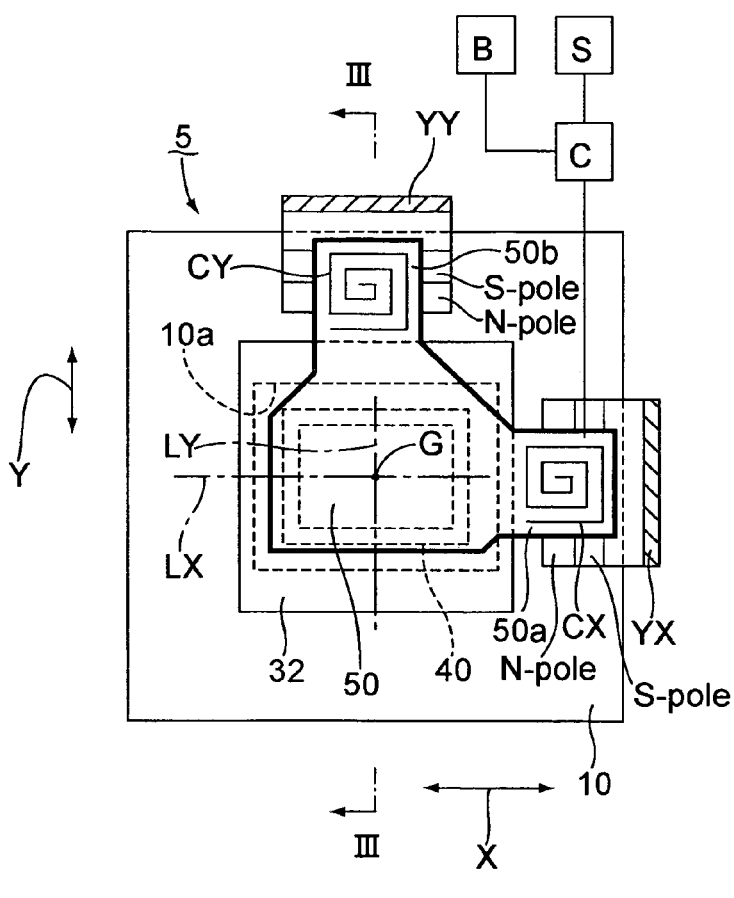
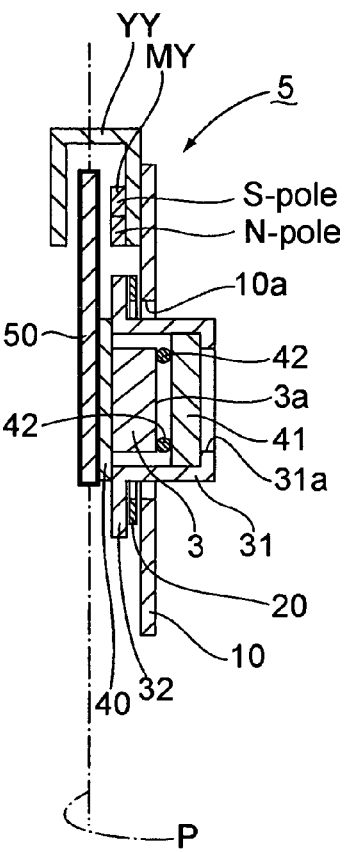

STAGE APPARATUS AND CAMERA SHAKE CORRECTION APPARATUS USING THE STAGE APPARATUS

BACKGROUND OF THE INVENTION

1. Field of the Invention

The present invention relates to a stage apparatus which linearly moves a stage plate in two orthogonal directions, and a camera shake correction apparatus using the stage apparatus.

2. Description of the Prior Art

A known stage apparatus in which a stage plate is linearly moved in two orthogonal directions in a plane is described, for example, Japanese Unexamined Patent No. 2003-57707.

In such a stage apparatus, a stationary support plate, an X-direction moving plate and Y-direction moving plate, parallel with the stationary support plate are provided. The X-direction moving plate is movable only in a specific X-direction, parallel with the stationary support plate relative to the support plate. The Y-direction moving plate is movable only in the Y-direction, parallel with the support plate and perpendicular to the X-direction, relative to the X-direction moving plate.

The stationary support plate and the X-direction moving plate are each provided with two X-direction mounting pieces (first X-direction mounting piece and second X-direction mounting piece). Corresponding first and second X-direction mounting pieces are laid one on top of the other, and thereafter, X-direction mounting pins extending in the X-direction are inserted in the first and second X-direction mounting pieces (which are laid one on top of the other) to mount the X-direction moving plate to the stationary support plate so as to be moveable in the X-direction with respect to the stationary support plate.

The X-direction moving plate and the Y-direction moving plate are each provided with two Y-direction mounting pieces (first Y-direction mounting piece and second Y-direction mounting piece). Corresponding first and second Y-direction mounting pieces are laid one on top of the other, and thereafter, Y-direction mounting pins extending in the Y-direction are inserted in the first and second Y-direction mounting pieces (which are laid one on top of the other) to mount the Y-direction moving plate to the X-direction moving plate so as to be moveable in the Y-direction with respect to the stationary support plate.

When a linear moving force in the X-direction is exerted on the X-direction moving plate by an actuator, the X-direction moving plate and the Y-direction moving plate are linearly moved in the X-direction along the X-direction mounting pins relative to the stationary support plate. When a linear moving force in the Y-direction is exerted on the Y-direction moving plate by the actuator, the Y-direction moving plate is linearly moved in the Y-direction along the Y-direction mounting pins relative to the X-direction moving plate.

However, the above-described stage apparatus of the prior art is constructed out of a large number of components, thus leading to a complicated structure and the assembling operation is troublesome.

SUMMARY OF THE INVENTION

The present invention provides a simple stage apparatus which is constructed out of a relatively few number of components and can be easily assembled. A camera shake prevention apparatus using such a stage apparatus is also provided.

According to an aspect of the present invention, a stage apparatus is provided, including a stationary support plate; an X-direction moving member which is supported on the stationary support plate by an X-direction guide device so as to be move only in a specific X-direction; and a Y-direction moving member which is supported on the X-direction moving member by a Y-direction guide device so as to be movable only in a Y-direction perpendicular to the X-direction and parallel with the support plate. The X-direction guide device is provided with an X-direction elongated hole which extends in the X-direction and which is formed in one of the X-direction moving member and the stationary support plate, and an X-direction engagement projection which is provided on the other of the X-direction moving member and the stationary support plate and is engaged in the X-direction elongated hole so as to be movable only in the X-direction. The Y-direction guide device is provided with a Y-direction elongated hole which extends in the Y-direction and which is formed in one of the X-direction moving member and the Y-direction moving member, and a Y-direction engagement projection which is provided on the other of the X-direction moving member the Y-direction moving member and is engaged in the Y-direction elongated hole so as to be movable only in the Y-direction.

It is desirable for a plurality of the X-direction elongated holes and a plurality of the X-direction engagement projections to be aligned along a straight line parallel with the X-direction, so that the X-direction engagement projections are respectively engaged in corresponding the X-direction elongated holes.

It is desirable for a plurality of the Y-direction elongated holes and a plurality of the Y-direction engagement projections to be aligned along a straight line parallel with the Y-direction, so that the Y-direction engagement projections are respectively engaged in corresponding the Y-direction elongated holes.

It is desirable for the stage apparatus to include an X-direction actuator which moves the Y-direction moving member in the X-direction relative to the stationary support plate, and a Y-direction actuator which moves the Y-direction moving member in the Y-direction.

It is desirable for the stage apparatus to include an X-direction actuator which moves the X-direction moving member in the X-direction relative to the stationary support plate, and a Y-direction actuator which moves the Y-direction moving member in the Y-direction relative to the X-direction moving member.

It is desirable for the camera shake correction apparatus to further include a camera including the stage apparatus; an image pickup device secured to a front surface of the Y-direction moving member and having an image pickup surface positioned at an image forming surface of an optical system of the camera; a shake detection sensor which detects a camera shake; and a control device for driving the X-direction actuator and the Y-direction actuator, based on shake information detected by the shake detection sensor, so as to correct the camera shake.

It is desirable for the camera shake correction apparatus to further include a camera including the stage apparatus; a correction lens secured to the Y-direction moving member in front of a focal plane of an optical system of the camera, the correction lens provided perpendicular to an optical axis of the optical system; a shake detection sensor which detects a camera shake; and a control device for driving the X-direction actuator and the Y-direction actuator, based on shake information detected by the shake detection sensor, so as to correct the camera shake.

According to the present invention, a simple stage apparatus in which the number of the components is reduced and which can be easily assembled can be obtained. Furthermore, a camera shake correction apparatus using such a stage apparatus can be obtained.

The present disclosure relates to subject matter contained in Japanese Patent Application No. 2004-48365 (filed on Feb. 24, 2004) which is expressly incorporated herein in its entirety.

BRIEF DESCRIPTION OF THE DRAWINGS

The present invention will be discussed below in detail with reference to the accompanying drawings, in which:

FIG. 2 is a rear view of a camera shake correction apparatus according to an embodiment of the present invention, wherein a yoke member is shown in section;

FIG. 3 is a sectional view taken along the line III-III in FIG. 2;

DESCRIPTION OF THE PREFERRED EMBODIMENTS

An embodiment of the present invention will be discussed below with reference to the accompanying drawings.

Figure 1:
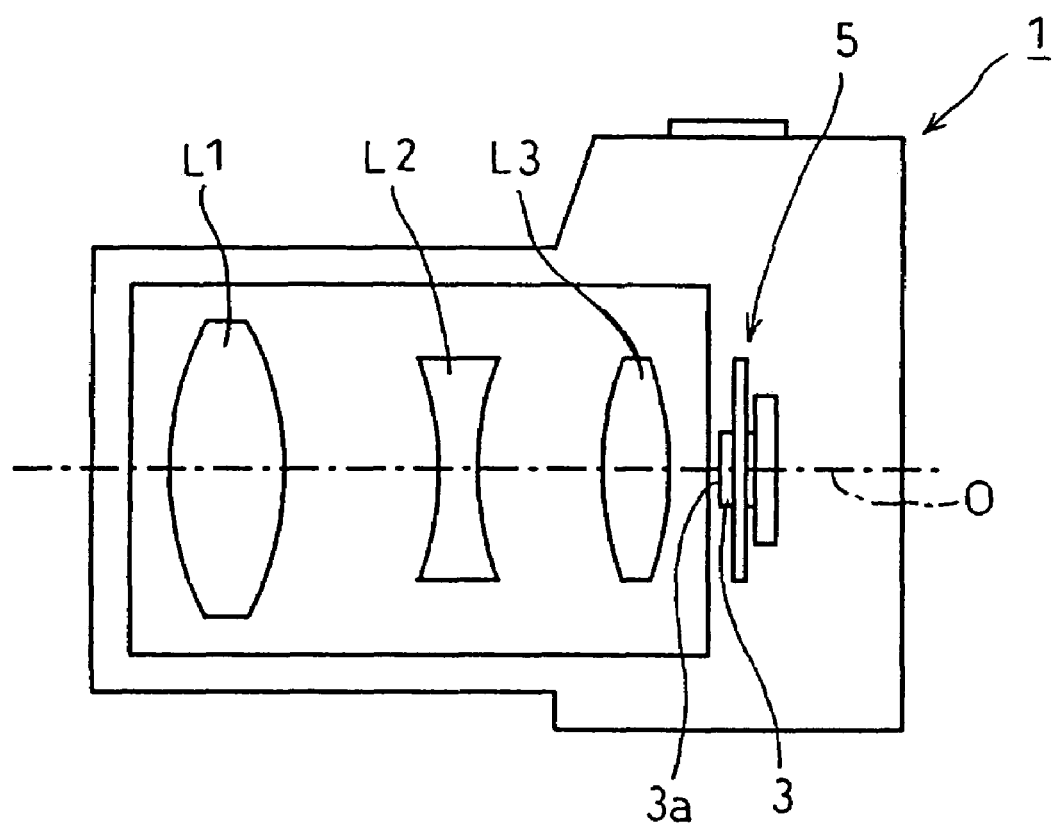
FIG. 1 is a longitudinal sectional view of a digital camera having therein a camera shake correction apparatus according to an embodiment of the present invention.

As can be seen in FIG. 1, an optical system including a plurality of lenses L1, L2 and L3 is provided in a digital camera 1. A CCD (image pickup device) 3 is provided behind the lens L3. The CCD 3 is provided with an image pickup surface 3a which is located on an image forming surface perpendicular to the optical axis O of the optical system and is secured to a camera shake correction apparatus 5 incorporated in the digital camera 1.

The camera shake correction apparatus 5 is constructed as described in the following description with reference to FIGS. 2 through 10.

Figure 6:
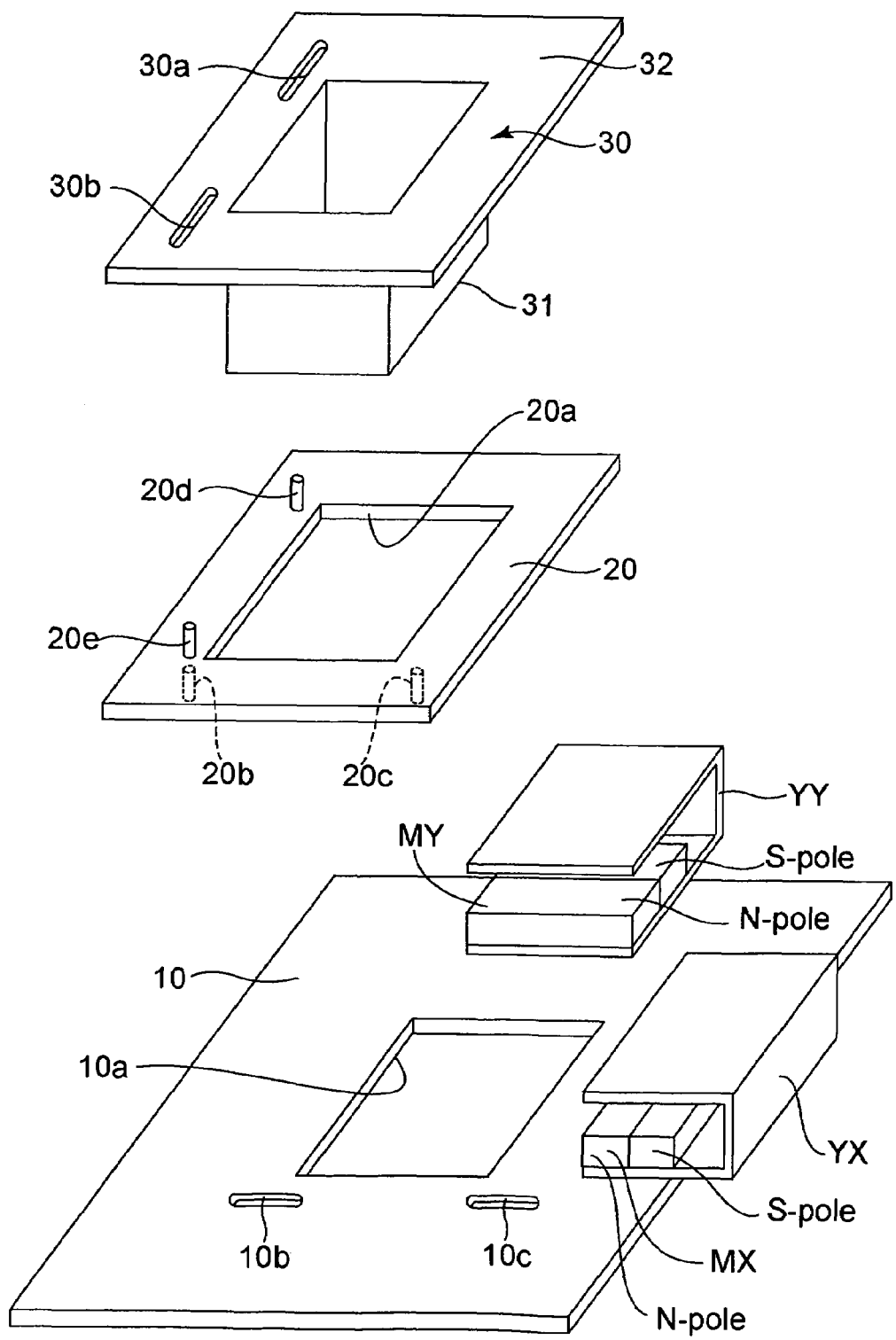
FIG. 6 is an exploded perspective view of a stage apparatus.

In FIG. 2, a stationary support plate 10, which is square in shape when viewed from the rear of the camera shake correction apparatus 5, is provided in the central portion thereof with a square receiving hole 10a. The stationary support plate 10 is secured to the body of the digital camera 1 by a securing device (not shown) so that the stationary support plate 10 is positioned perpendicular to the optical axis O and the optical axis passes through the center of the receiving hole 10a. The stationary support plate 10 is provided with a pair of right and left X-direction elongated holes (X-direction guide device) 10b and 10c below the receiving hole 10a, as shown in FIG. 6. The X-direction elongated holes 10b and 10c are elongated in the X-direction (indicated by arrows X in FIG. 2 and FIGS. 7 to 10, i.e., in the lateral direction in the drawings) and are aligned along a line parallel with the X-direction.

A moving plate 20 (X-direction moving member), which is square in shape when viewed from the rear of the camera shake correction apparatus 5 and is smaller than the stationary support plate 10, is provided on the central portion thereof with a receiving hole 20a which is longer in the X-direction than that of the receiving hole 10a and has the same length in the Y-direction (indicated by arrows Y in FIG. 2 and FIGS. 7 to 10, i.e., upward and downward direction in the drawings) as the receiving hole 10a. The moving plate 20 is provided on its front surface with a pair of X-direction engagement pins 20b and 20c (X-direction engagement projections/X-direction guide device) below the receiving hole 20a. The X-direction engagement pins 20b and 20c are aligned in the X-direction and in parallel with the optical axis O. The pair of X-direction engagement pins 20b and 20c are aligned linearly, parallel to the X-direction. The pair of X-direction engagement pins 20b and 20c are respectively engaged with the pair of right and left X-direction elongated holes 10b and 10c so as to be moveable only in the X-direction, so that the front surface of the moving plate 20 abuts the rear surface of the stationary support plate 10. Furthermore, the moving plate 20 is provided on the rear surface thereof with a pair of upper and lower Y-direction engagement pins (Y-direction engagement projections/Y-direction guide device) 20d and 20e on the left side of the receiving hole 20a (with respect to FIGS. 6, 7 and 8). The pair of upper and lower Y-direction engagement pins 20d and 20e are aligned parallel with the optical axis O, and are aligned linearly, perpendicular to the X-direction.

A cover member (Y-direction moving member) 30 includes a bulged portion (projection) 31 which projects forward, and a plate portion 32 which extends from the rear end of the projection 31 on a plane parallel to both the stationary support plate 10 and the moving plate 20. The projection 31 is provided on the front surface thereof with a light receiving opening 31a (see FIG. 3) having a square shape in when viewed from the front of the camera shake correction apparatus 5. The lengths of the projection 31 in the X and Y directions are smaller than those of the receiving holes 20a. The length of the plate portion 32 in the X-direction is substantially the same as the length of the moving plate 20 in the X-direction. The plate portion 32 is provided on the left side thereof (with respect to FIG. 6) with a pair of Y-direction elongated holes (Y-direction guide device) 30a and 30b which are aligned linearly in the Y-direction.

The projection 31 is received in the receiving holes 20a and 10a so as to move in the X-direction within the maximum. X-direction displacement of the X-direction engagement pins 20b and 20c defined by the length of the X-direction elongated holes 10b and 10c, and to move in the Y-direction within the maximum Y-direction displacement of the Y-direction engagement pins 20d and 20e defined by the length of the Y-direction elongated holes 30a and 30b (in order to prevent the projection 31 from coming into contact with the receiving holes 10a and 20a). The upper and lower engagement pins 20d and 20e are received in the upper and lower Y-direction elongated holes 30a and 30b, respectively, so as to move only in the Y-direction, and the front surface of the plate portion 32 abuts against the rear surface of the moving plate 20.

A base plate 40 having the CCD 3 secured to the front surface thereof is secured at the front surface thereof to the rear surface of the plate portion 32 (FIG. 3), so that in a front elevational view, the image pickup surface 3a of the CCD 3 is entirely exposed through the light receiving hole 31a. Consequently, the base plate 40 and the cover member 30 constitute a Y-direction moving member. Furthermore, a low-pass filter 41 made of a transparent material is provided in the internal space of the projection 31 and abuts against a front portion of the cover member 30. A retainer plate 42 having a square annular shape in a front elevation is provided between the periphery of the image pickup surface 3a provided on the front surface of the CCD 3 and the low-pass filter 41, and is in contact with the periphery of the image pickup surface 3a and the rear surface of the low-pass filter 41.

A plurality of retaining members (not shown) that protrude from the rear surface of the stationary support plate 10 abut against the rear surface of the plate portion 32 of the cover member 30, so that the rearward movement of the cover member 30 is prevented by the retaining members.

As can be seen in FIGS. 2 and 3, an electric circuit board 50 is secured to the rear surface of the base plate 40. The circuit board 50 lies on an X-Y imaginary plane P (FIG. 3) parallel with the stationary support plate 10. The circuit board 50 is provided with a large number of conductor wires (not shown) to which the CCD 3 is electrically connected. The circuit board 50 is provided with two projecting tongues 50a and 50b which are provided on the rear surfaces thereof with planar X-direction drive coil (X-direction actuator) CX and Y-direction drive coil (Y-direction actuator) CY, respectively, which are printed thereon.

Figure 4:
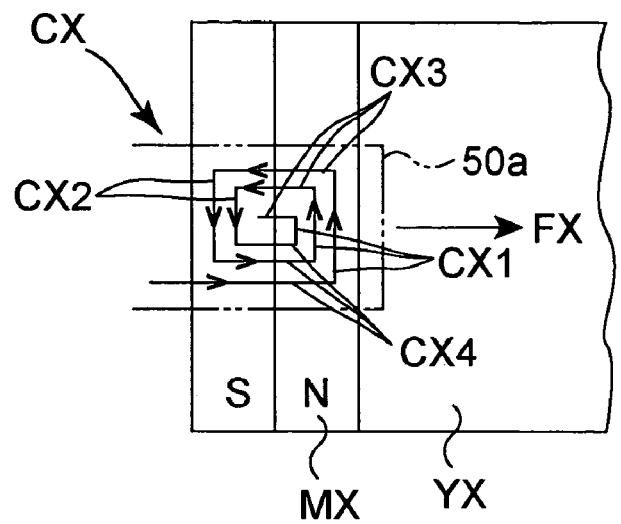
FIG. 4 is an enlarged schematic view of an X-direction drive device.
Figure 5:
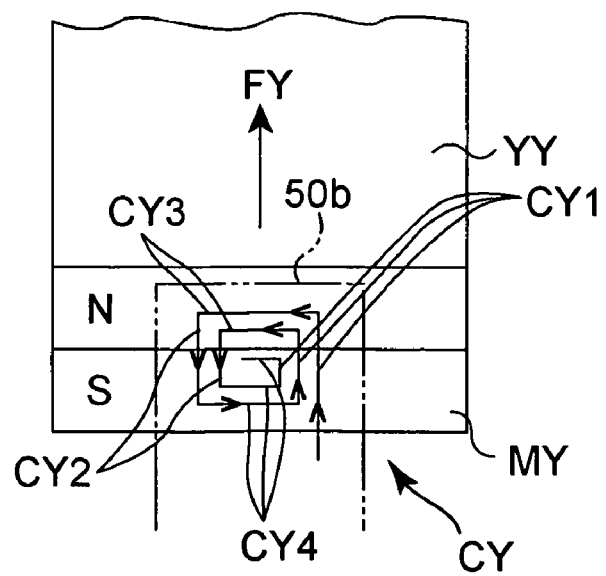
FIG. 5 is an enlarged schematic view of a Y-direction drive device.

As shown in FIG. 4, the X-direction drive coil CX is rectangularly coiled and is defined by linear right sides CX1, linear left sides CX2, linear upper sides CX3 and linear lower sides CX4. As shown in FIG. 5, the Y-direction drive coil CY is rectangularly coiled and is defined by linear right sides CY1, linear left sides CY2, linear upper sides CY3 and linear lower sides CY4. Although the X-direction drive coil CX and the Y-direction drive coil CY have several turns in the drawings, it is desirable for the number of turns thereof to be several tens.

Each end of the X-direction drive coil CX and each end of the Y-direction drive coil CY are connected to the conductor wires of the circuit board 50. Furthermore, as shown in FIG. 2, an imaginary X-direction line LX which extends in the X-direction and passes through the center of the X-direction drive coil CX, passes through the center of the CCD 3; similarly, an imaginary Y-direction line LY which extends in the Y-direction and passes through the center of the Y-direction drive coil CY, passes through the center of the CCD 3. Moreover, the center of gravity G of the moving plate 20, the cover member 30, the base plate 40, the circuit board 50, the X-direction drive coil CX and the Y-direction circuit board CY, which are all movable relative to the stationary support plate 10, is located on the center of the CCD 3 in the forward and rearward direction of the camera shake correction apparatus 5.

The stationary support plate 10 is provided with two yoke members (X-direction actuator and Y-direction actuator) YX and YY secured to the rear surface thereof. The two yoke members YX and YY are made of a soft magnetic material such as metal, and are U-shaped in cross section. The yoke members YX and YY are provided on their inner surfaces with magnets (X-direction actuator and Y-direction actuator) MX and MY secured thereto. The magnet MX of the yoke member YX includes a N-pole and a S-pole are aligned in the X-direction, and the magnet MY of the yoke member YY includes a N-pole and a S-pole which are aligned in the Y-direction.

As shown in FIG. 3, the front end of the yoke member YY is opposed to the magnet MY to form a magnetic circuit, together with the magnet MY.

Likewise, the front end of the yoke member YX forms a magnetic circuit, together with the magnet MX.

As can be seen in FIGS. 2 and 3, the projecting tongues 50a and 50b of the circuit board 50 are located in the yoke members YX and YY, respectively.

As shown in FIG. 2, the digital camera 1 is provided with a battery B, a camera shake detection sensor S which detects the camera shake of the digital camera 1, and a control circuit (control device) C which supplies the electric power of the battery B to the drive coils CX and CY while varying the direction and magnitude thereof in accordance with shake information detected by the camera shake detection sensor S. The battery B and the camera shake detection sensor S are connected to the control circuit C which is electrically connected to the conductor wires of the circuit board 50.

The components of the camera shake correction apparatus 5 (other than the battery B, the shake detection sensor S and the control circuit C) as constructed above constitute a stage apparatus of the present invention.

The camera shake correction apparatus 5 operates as follows.

In a photographing operation carried out by the digital camera 1, light transmitted through the lenses L1 through L3 is converged onto the image pickup surface 3a of the CCD 3 through the light receiving opening 31a and the low-pass filter 41 to form an image. If a camera shake correction switch (not shown) of the digital camera is turned ON during the photographing operation, the shake detection sensor S does not detect the camera shake when no camera shake (image movement) of the digital camera 1 occurs. Consequently, the camera shake correction apparatus 5 is maintained in an inoperative position as shown in FIG. 2. If a camera shake of the digital camera 1 occurs, the shake detection sensor S detects the camera shake, and the shake information is supplied to the control circuit C. As a result, the control circuit C supplies electric current generated by the battery B to the X-direction drive coil CX and the Y-direction drive coil CY, while adjusting the direction and the magnitude of the electric current.

Figure 7:
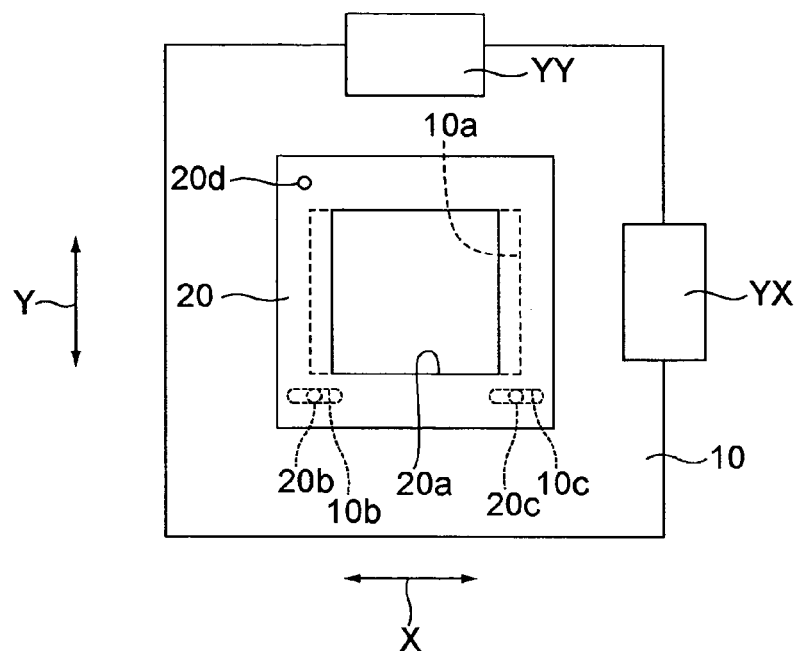
FIG. 7 is a rear view of a stationary support plate and a moving plate in an inoperative position.
Figure 8:
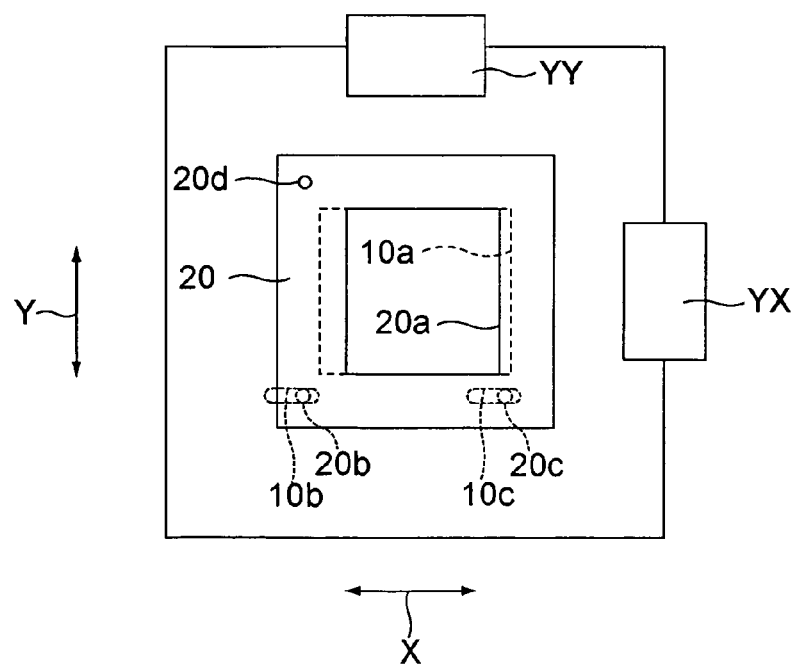
FIG. 8 is a rear view of a stationary support plate and a moving plate in an operative position.

FIGS. 7 and 8 show the positional relationship between the stationary support plate 10 and the moving plate 20 in the X and Y directions when the camera shake correction apparatus 5 is in an inoperative position and in an operative position, respectively (In FIGS. 7 and 8, the Y-direction engagement pins 20e are omitted for clarity).

In an inoperative position, as shown in FIG. 4, the linear right sides CX1 of the X-direction drive coil CX are located on the N-pole of the magnet MX, and the linear left sides CX2 of the X-direction drive coil CX are located on the S-pole of the magnet MX, respectively. In this position, if the electric current is supplied to the X-direction drive coil CX in the direction indicated by the arrows in FIG. 4, the right linear force FX in the X-direction is produced in the right sides CX1 and the linear left sides CX2. The right linear force FX is transmitted to the cover member 30 integral with the circuit board 50 via the base plate 40 and the moving plate 20 (whose movement relative to the cover member 30 in the X-direction is restricted by the engagement between the Y-direction elongated holes 30a and 30b and the Y-direction engagement pins 20d and 20e). In the inoperative position, the stationary support plate 10 and the moving plate 20 are located in a position shown in FIG. 8 in which the center of the receiving hole 10a and the center of the receiving hole 20a are aligned with each other with respect to the forward and rearward direction. When the right linear force FX is applied to the moving plate 20, the X-direction engagement pins 20b and 20c are moved toward the right in the X-direction along the X-direction elongated holes 10b and 10c relative to the stationary support plate 10. As a result, the electric circuit board 50, integral with the moving plate 20 via the base plate 40 and the cover member 30 in the X-direction, is moved in the right direction, relative to the stationary support plate 10. Note that forces are produced in the linear upper sides CX3 and the linear lower sides CX4, however, these forces cancel each other out and are not applied to the circuit board 50.

The moving plate 20 (the cover member 30 and the circuit board 50) is movable in the X-direction due to the engagement between the X-direction engagement pins 20b and 20c and the X-direction elongated holes 10b and 10c within the range by which the linear right sides CX1 are overlapped on the N-pole and the linear left sides CX2 are overlapped on the S-pole. When electric current in a direction opposite to the arrows shown in FIG. 4 is supplied to the X-direction drive coil CX, linear forces toward the left in the X-direction are produced in the linear right sides CX1 and the linear left sides CX2, so that the circuit board 50 is moved in the left direction relative to the stationary support plate 10 due to the engagement between the X-direction elongated holes 10b and 10c and the X-direction engagement pins 20b and 20c, respectively.

As mentioned above, the control circuit C adjusts the direction of the electric current to be supplied to the X-direction drive coil CX so that the moving plate 20 is moved in the right or left direction together with the circuit board 50.

Moreover, as soon as the supply of the current from the battery B to the X-direction drive coil CX is stopped, the movement of the circuit board 50 is stopped due to absence of the force in the X-direction.

Since the magnitude of the force is proportional to the magnitude of the current to be supplied to the X-direction drive coil CX, the force applied to the X-direction drive coil CX is increased or reduced by increasing or reducing the current supplied to the X-direction drive coil CX from the battery B.

Figure 9:
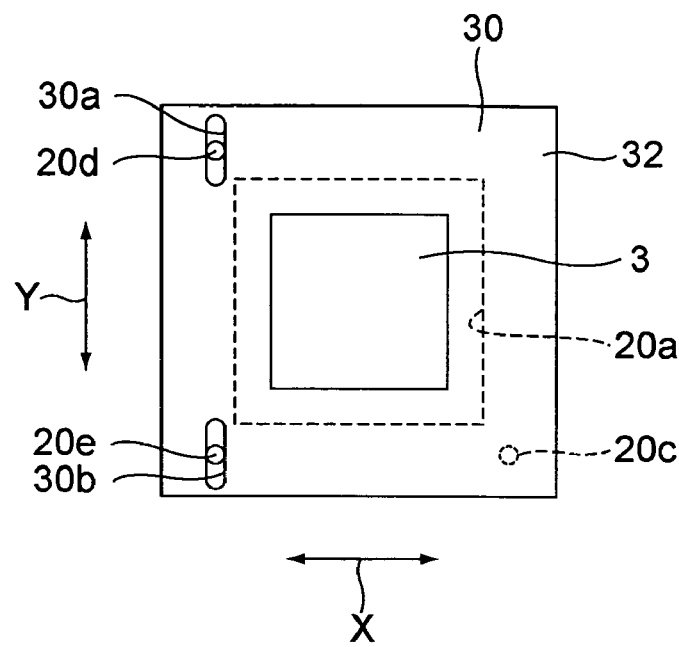
FIG. 9 is a rear view of a moving plate and a cover member in an inoperative position.
Figure 10:
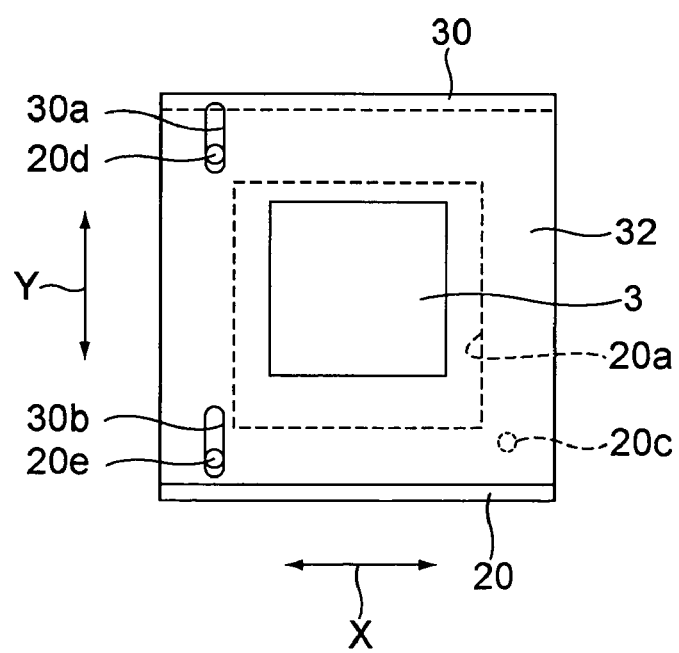
FIG. 10 is a rear view of a moving plate and a cover member in an operative position.

FIGS. 9 and 10 show the positional relationship between the moving plate 20 and the cover member 30 in the X and Y directions when the camera shake correction apparatus 5 is in an inoperative position and in an operative position, respectively (In FIGS. 9 and 10, the X-direction engagement pins 20b are in the same positions in the X and Y directions as the Y-direction engagement pins 20e and hence are hidden).

In an inoperative position, as shown in FIG. 5, the linear upper sides CY3 of the Y-direction drive coil CY are located on the N-pole of the magnet MY, and the linear lower sides CY4 of the Y-direction drive coil CY are located on the S-pole of the magnet MY, respectively. In this position, for example, if the electric current is supplied to the Y-direction drive coil. CY in the direction indicated by the arrows in FIG. 5, an upward linear force FY in the Y-direction is produced in the linear upper sides CY3 and the linear lower sides CY4. The upward linear force FY is transmitted to the cover member 30, integral with the circuit board 50 through the base plate 40. In the inoperative position, the cover member 30 and the moving plate 20 are located in a position shown in FIG. 9. When the upward linear force FY is applied to the cover member 30, the Y-direction elongated holes 30a and 30b are moved in the upward and Y direction relative to the Y-direction engagement pins 20d and 20e. As a result, the electric circuit board 50, integral with the cover member 30 is moved in the upward Y-direction, relative to the stationary support plate 10. Note that forces are produced in the linear right sides CY1 and the linear left sides CY2, however, these forces cancel each other out and are not applied to the circuit board 50.

The cover member 30 (the circuit board 50) is movable in the Y-direction due to the engagement between the Y-direction engagement pins 20d and 20e and the Y-direction elongated holes 30a and 30b within the range by which the linear upper sides CY3 are overlapped on the N-pole and the linear lower sides CY4 are overlapped on the S-pole. When electric current in a direction opposite to the arrows shown in FIG. 5 is supplied to the Y-direction drive coil CY, the linear forces downward in the Y-direction are produced in the linear upper sides CY3 and the linear lower sides CY4, so that the circuit board 50 is moved in the downward direction relative to the stationary support plate 10 due to the engagement between the Y-direction elongated holes 30a and 30b and the Y-direction engagement pins 20d and 20e.

As mentioned above, the control circuit C adjusts the direction of the electric current to be supplied to the Y-direction drive coil CY so that the circuit board 50 is moved in the upward and downward direction within the range in which the projection 31 does not abut against the receiving opening 20a and the receiving opening 10a.

Moreover, as soon as the supply of the current from the battery B to the Y-direction drive coil CY is stopped, the movement of the circuit board 50 is stopped due to absence of the force in the Y-direction.

Since the magnitude of the force is proportional to the magnitude of the current to be supplied to the Y-direction drive coil CY, the force applied to the Y-direction drive coil CY is increased or reduced by increasing or reducing the current supplied to the Y-direction drive coil CY from the battery B.

Accordingly, camera shake can be corrected by varying the position of the CCD 3 secured to the base plate 40 in the X and Y directions in accordance with the reciprocal movement of the circuit board 50 in the X and Y directions.

In the stage apparatus discussed above, the moving plate 20, which constitutes an X-direction moving member, is attached to the stationary support plate 10 so as to relatively move only in the X-direction via engagement of the X-direction engagement pins 20b and 20c in the X-direction elongated holes 10b and 10c, respectively. Furthermore, the cover member 30, which constitutes a Y-direction moving member, is attached to the moving plate 20 so as to relatively move only in the Y-direction by engaging the Y-direction engagement pins 20d and 20e of the moving plate 20 in the Y-direction elongated holes 30a and 30b, respectively, of the cover member 30. Accordingly, the assembling operation can be facilitated. In addition to the foregoing, since the stage apparatus is constructed out of a lesser number of components and is very simple in structure, the manufacturing cost can be reduced.

Since the X-direction elongated holes 10b and 10c and the X-direction engagement pins 20b and 20c are aligned along a straight line extending in the X-direction, the precision of the movement of the X-direction engagement pins 20b and 20c is enhanced in comparison with an arrangement in which the X-direction elongated holes 10b and 10c and the X-direction engagement pins 20b and 20c are not aligned along a straight line extending in the X-direction.

Figure 11:
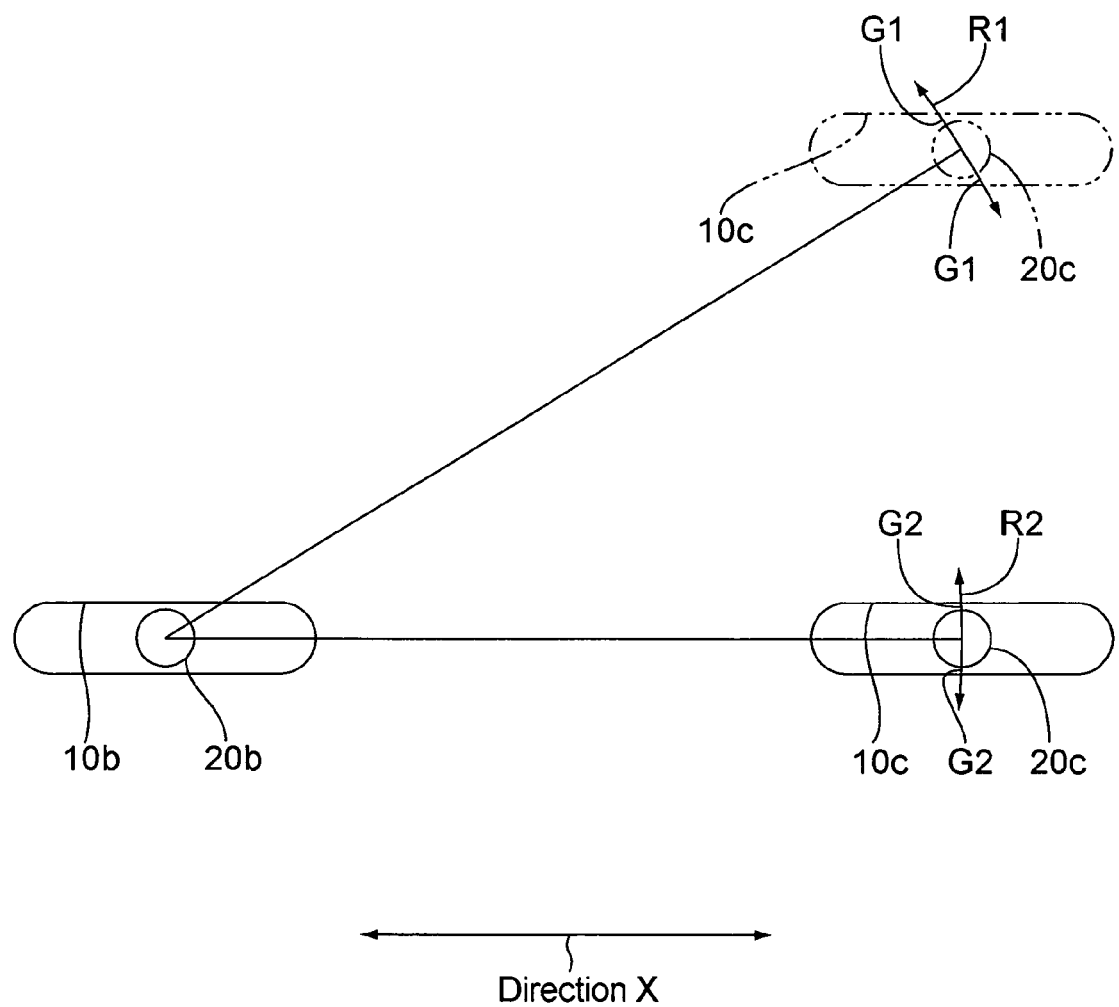
FIG. 11 is a schematic view of two X-direction engagement pins and two X-direction elongated holes which are aligned along a line in the X-direction to explain the effect expected from the present invention.

Namely, as shown in FIG. 11, due to manufacturing error of the various components of the stage apparatus, a force in a relative rotational direction can occur between the X-direction engagement pin 20c and the X-direction engagement pin 20b, and if the X-direction engagement pins 20b and 20c are not aligned along a straight line in the X-direction, a gap G1 between the X-direction engagement pin 20c and the X-direction elongated hole 10c in the direction of rotation R1 is larger than the corresponding gap G2 in the direction of rotation R2 when the X-direction engagement pin 20c and the X-direction elongated hole 10b and 10c (the X-direction engagement pins 20b and 20c) are aligned along a straight line in the X-direction. Therefore, backlash between the X-direction engagement pin 20c and the X-direction elongated hole 10c increases, thus resulting in lower precision of movement (than in the case where the X-direction engagement pin 20c and the X-direction elongated hole 10b and 10c (the X-direction engagement pins 20b and 20c) are aligned along a straight line in the X-direction). Backlash would also increase between the X-direction engagement pin 20b and the X-direction engagement pin 20c in a similar manner.

Furthermore, since the Y-direction engagement pins 20d and 20e and the Y-direction elongated holes 30a and 30b are aligned along a straight line in the Y-direction, the precision of the movement of the Y-direction engagement pins 20d and 20e is higher than in the case where the Y-direction engagement pins 20d and 20e and the Y-direction elongated holes 30a and 30b are not aligned along a straight line in the Y-direction.

Moreover, as the intersection between the straight line LX in the X-direction and the straight line LY in the Y-direction is located on the center of gravity G of the entirety of the moving plate 20, the cover member 30 which forms a Y-direction moving member, the base plate 40, the circuit board 50, the X-direction drive coil CX, and the Y-direction drive coil CY in the forward and rearward direction, which are all movable relative to the stationary support plate 10, the force produced in the X-direction drive coils CX and the Y-direction drive coil CY are effectively transmitted to the circuit board 50. Therefore, the circuit board 50 can be smoothly moved in the X and Y directions.

In an alternative embodiment, it is possible to form the X-direction elongated holes 10b and 10c in the moving plate 20 and to form the X-direction engagement pins 20b and 20c on the stationary support plate 10. It is also possible to provide a single X-direction elongated hole and a single X-direction engagement pin which is elongated in the X-direction and, for example, has a substantially rectangular shape having longer sides in the X-direction, and being shorter than the X-direction elongated hole in the X-direction. The X-direction engagement pin is movable in the X-direction elongated hole only in the X-direction and is not relatively rotatable with respect to the X-direction elongated hole.

Alternatively, it is possible to form the Y-direction elongated holes 30a and 30b in the moving plate 20 and to form the Y-direction engagement pins 20d and 20e on the cover member 30. It is also possible to provide a single Y-direction elongated hole and a single Y-direction engagement pin which is elongated in the Y-direction and, for example, has a substantially rectangular shape having longer sides in the Y-direction, and being shorter than the Y-direction elongated hole in the Y-direction. The Y-direction engagement pin is movable in the Y-direction elongated hole only in the Y-direction and is not relatively rotatable with respect to the Y-direction elongated hole.

Figure 12:
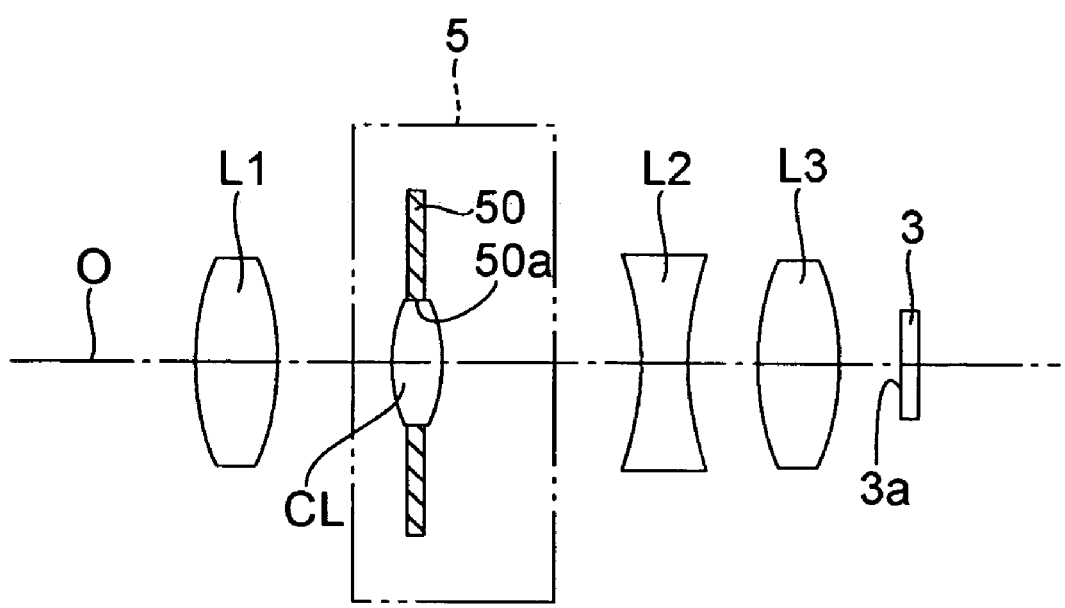
FIG. 12 is a schematic view of a camera shake correction apparatus according to a modified embodiment of the present invention, wherein a correction lens is provided.

Although the CCD 3 is secured to the circuit board 50 which is moved in the X and Y directions to compensate the camera shake in the illustrated embodiment, it is possible to arrange the CCD 3, for example as shown in FIG. 12, behind the camera shake correction apparatus 5 and to form a circular mounting hole 50a in the circuit board 50. A correction lens CL can be fitted and secured to the mounting hole 50a and can be arranged between the lenses L1 and L2 as shown in FIG. 12 (or alternatively between the lenses L2 and L3). In this alternative, the correction lens CL is linearly moved in the X and Y directions to compensate the camera shake. Furthermore, the camera shake correction apparatus 5 using the correction lens CL can be applied to a silver-halide film camera having no CCD 3.

Furthermore, even if the X-direction line LX is not precisely located on the center of gravity G of the entirety of the moving plate 20, the cover member 30, the base plate 40, the circuit board 50, the X-direction drive coil CX and the Y-direction drive coil CY, which are all movable relative to the stationary support plate 10, but is located near the center of gravity G, the forces generated in the X-direction drive coil CX and the Y-direction drive coil CY can still be effectively transmitted to the circuit board 50.

In addition to the foregoing, it is possible to provide the X-direction drive coil CX and the Y-direction drive coil CY on the stationary support plate 10 and to provide the yoke members YX and YY (and the magnets MX and MY) on the circuit board 50.

Furthermore, it is possible to provide more than two X-direction elongated holes 10b, 10c and X-direction engagement pins 20b, 20c. It is also possible to provide more than two Y-direction elongated holes 30a, 30b and Y-direction engagement pins 20d, 20e.

It is possible to use a motor or a piezoelectric element in order to move the circuit board 50 in the X and Y directions in place of an electromagnetic actuator including the X-direction and Y-direction drive coils CX and CY, the magnets MX and MY, and the yoke members YX and YY.

Although the above discussion has been addressed to an embodiment of a stage apparatus applied to a camera shake correction apparatus 5, the application of the stage apparatus of the present invention is not limited thereto. The invention can be variously applied to an apparatus in which a circuit board is moved in the X and Y directions parallel with the circuit board.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera shake correction apparatus using a stage apparatus, comprising:
   (a) a camera including the stage apparatus, the stage apparatus comprising:
   (a)(1) a stationary support plate;
   (a)(2) an X-direction moving member which is supported on the stationary support plate by an X-direction guide device so as to be movable only in a specific X-direction;

(a)(3) a Y-direction moving member which is supported on the X-direction moving member by a Y-direction guide device so as to be movable only in a Y-direction perpendicular to the X-direction and parallel with the support plate;

(a)(4) an X-direction actuator which moves the X-direction moving member in the X-direction relative to the stationary support plate, and (a)(5) a Y-direction actuator which moves the Y-direction moving member in the Y-direction relative to the X-direction moving member, (b) an image pickup device secured to a front surface of the Y-direction moving member and having an image pickup surface positioned at an image forming surface of an optical system of the camera;

(c) a shake detection sensor which detects a camera shake; and (d) a control device for driving the X-direction actuator and the Y-direction actuator, based on shake information detected by the shake detection sensor, so as to correct the camera shake, wherein the X-direction guide device is provided with an X-direction elongated hole which extends in the X-direction and which is formed in one of the X-direction moving member and the stationary support plate, and an X-direction engagement projection which is provided on the other of the X-direction moving member and the stationary support plate and is engaged in the X-direction elongated hole so as to be movable only in the X-direction, and wherein the Y-direction guide device is provided with a Y-direction elongated hole which extends in the Y-direction and which is formed in one of the X-direction moving member and the Y-direction moving member, and a Y-direction engagement projection which is provided on the other of the X-direction moving member and the Y-direction moving member and is engaged in the Y-direction elongated hole so as to be movable only in the Y-direction.

2. The stage apparatus according to claim 1,
wherein a plurality of the X-direction elongated holes and a plurality of the X-direction engagement projections are aligned along a straight line parallel with the X-direction, so that the X-direction engagement projections are respectively engaged in corresponding the X-direction elongated holes.

3. The stage apparatus according to claim 1,
wherein a plurality of the Y-direction elongated holes and a plurality of the Y-direction engagement projections are aligned along a straight line parallel with the Y-direction, so that the Y-direction engagement projections are respectively engaged in corresponding the Y-direction elongated holes.

4. A camera shake correction apparatus using a stage apparatus, comprising:

(a) a camera including the stage apparatus, the stage apparatus comprising:

(a)(1) a stationary support plate;

(a)(2) an X-direction moving member which is supported on the stationary support plate by an X-direction guide device so as to be movable only in a specific X-direction; and (a)(3) a Y-direction moving member which is supported on the X-direction moving member by a Y-direction guide device so as to be movable only in a Y-direction perpendicular to the X-direction and parallel with the support plate;

(a)(4) an X-direction actuator which moves the X-direction moving member in the X-direction relative to the stationary support plate, and (a)(5) a Y-direction actuator which moves the Y-direction moving member in the Y-direction relative to the X-direction moving member, (b) a correction lens secured to the Y-direction moving member in front of a focal plane of an optical system of the camera, the correction lens provided perpendicular to an optical axis of the optical system;

(c) a shake detection sensor which detects a camera shake; and (d) a control device for driving the X-direction actuator and the Y-direction actuator, based on shake information detected by the shake detection sensor, so as to correct the camera shake, wherein the X-direction guide device is provided with an X-direction elongated hole which extends in the X-direction and which is formed in one of the X-direction moving member and the stationary support plate, and an X-direction engagement projection which is provided on the other of the X-direction moving member and the stationary support plate and is engaged in the X-direction elongated hole so as to be movable only in the X-direction, and wherein the Y-direction guide device is provided with a Y-direction elongated hole which extends in the Y-direction and which is formed in one of the X-direction moving member and the Y-direction moving member, and a Y-direction engagement projection which is provided on the other of the X-direction moving member and the Y-direction moving member and is engaged in the Y-direction elongated hole so as to be movable only in the Y-direction.

5. The stage apparatus according to claim 4,
wherein a plurality of the X-direction elongated holes and a plurality of the X-direction engagement projections are aligned along a straight line parallel with the X-direction, so that the X-direction engagement projections are respectively engaged in corresponding the X-direction elongated holes.

6. The stage apparatus according to claim 4,
wherein a plurality of the Y-direction elongated holes and a plurality of the Y-direction engagement projections are aligned along a straight line parallel with the Y-direction, so that the Y-direction engagement projections are respectively engaged in corresponding the Y-direction elongated holes.

* * * * *